United States Patent [19]

Bosse

[11] 3,721,602
[45] March 20, 1973

[54] APPARATUS FOR APPLYING HEAT-SEALED SEAMS TO AT LEAST TWO-PLY COMPOSITE MATERIAL OF WHICH THE CONFRONTING PLIES

[75] Inventor: Frank Bosse, Am Wasserwerk, Germany

[73] Assignee: Windmoller & Holscher, Westphalia, Germany

[22] Filed: Feb. 2, 1971

[21] Appl. No.: 111,842

[52] U.S. Cl. .................................. 156/583, 100/93 P
[51] Int. Cl. ......................... B30b 15/34, B02c 11/08
[58] Field of Search ..................... 156/583; 100/93 P

[56] References Cited

UNITED STATES PATENTS 2,802,086  8/1957  Fener ................................... 156/583
3,624,836  11/1971 Rohdin ................................. 156/583
3,198,685  8/1965  Kopito et al ......................... 156/583

Primary Examiner—Douglas J. Drummond
Attorney—Fleit, Gipple & Jacobson

[57] ABSTRACT

The invention relates to an apparatus for applying heat-sealed seams to at least two-ply composite material of which the confronting plies are heat-sealable at the operating temperature and the plies facing heat-sealing jaws are adapted to transmit the sealing heat without changing their structure. Such material is primarily used in machines for making hermetically sealed bags so that the humidity and aroma of the contents remain unaffected by the atmosphere. The inner ply of the bag can be a thermoplastic material while the ply which later forms the outside of the bag is either a non-thermoplastic carrier material such as aluminum foil or paper or a plastics material which has a higher melting point than the inner ply.

16 Claims, 6 Drawing Figures

INVENTOR
Frank BOSSE
BY
Fleit, Gipple & Jacobson
his ATTORNEYS

PATENTED MAR 20 1973 3,721,602

INVENTOR
Frank BOSSE
BY
Fleit, Gipple & Jacobson
his ATTORNEYS

APPARATUS FOR APPLYING HEAT-SEALED SEAMS TO AT LEAST TWO-PLY COMPOSITE MATERIAL OF WHICH THE CONFRONTING PLIES

For the purpose of applying heat-sealed seams either transversely to or lengthwise of the direction in which the composite material runs through the bag-making machine, sealing jaws are used for engaging between each other the composite material which has been folded to double thickness, at least one of the jaws being electrically heatable.

In one form of heat-sealing apparatus, only one of the jaws is heated and is in the form of an aluminium rail. The other jaw is unheated and provided with an elastic layer of silicon rubber. The elastic layer to a large extent compensates for differences in the thickness of the material to be heat-sealed lengthwise of the intended seam, such differences occurring, for example, if the seam runs through preformed side folds for the bags to be made from the material. The elastic layer on the unheated jaw of the heat-sealing apparatus therefore ensures that a reasonably uniform pressure is exerted on the material to be heat-sealed. However, the apparatus has the disadvantage that the sealing heat is transmitted from only one side of the composite material, namely, firstly through the carrier material to the first ply that is to be heat-sealed and through this ply to the confronting second ply. The two plies to be heat-sealed are therefore heated unevenly and it is impossible to produce a good seam, especially for thicker materials and if the number of plies is different.

To avoid this disadvantage, it is possible also to heat the jaw provided with the silicon rubber layer so that the plies to be heat-sealed will be heated from both sides. This will result in a relatively good heat-sealed seam but accurate temperature control is difficult because the heat from one jaw has to pass through the elastic layer. The difficulty of temperature control at the jaw having the elastic layer therefore makes it impossible to use such an apparatus for heat-sealing composite materials consisting of a plastics carrier film such as polypropylene and a plastics inner ply such as polyethylene if the melting point of the carrier film is only slightly higher than that of the inner ply. However, since such materials often have to be heat-sealed and since accurate temperature control at the sealing jaws is important, it has been necessary to dispense with an elastic layer altogether. Consequently, if the sealing bars of the jaws are even only slightly inclined as will occur with differences in the thickness of the carrier material, the inner ply to be heat-sealed will be squeezed off.

Another disadvantage associated with known heat-sealing equipment is the application of pressure by means of two or more pressers which transmit the pressure to the sealing bar of one of the jaws at isolated points, thereby preventing the formation of seams having substantially the same quality throughout their lengths.

The invention aims to provide heat-sealing apparatus which permits differences in the thickness of the composite material to be compensated, the temperature to be controlled as accurately as possible and seams to be formed which are of substantially the same good quality throughout their entire length.

According to the invention, apparatus having sealing jaws for heat-sealing two or multi-ply composite material in which the confronting plies are heat-sealable at the operating temperature and the plies facing the jaws are adapted to transmit the sealing heat without changing their structure comprises an elastic layer for one of the jaws to compensate for differences in the thickness of the composite material along the intended heat seal, the elastic layer being disposed between a heated flexible sealing bar and support means for the sealing bar. Thus, the elastic layer is provided on the side of the sealing bar remote from the composite material to be heat-sealed so that the heat need no longer pass through the rubber layer but will be transmitted direct to the composite material. By reason of the low section modulus, that is to say the low resistance to bending of the sealing bar which is kept as flat as possible, the sealing bar can simply flex and adapt itself to possible differences in thickness of the composite material, such flexure of the sealing bar being compensated by the elastic layer interposed between the sealing bar and the rigid support means for the sealing bar.

To avoid excessive transmission of heat from the sealing bar to other parts of the apparatus, the support means for the sealing bar may comprise a base bar, a thermally insulating intermediate layer and an intermediate bar, the intermediate bar being disposed adjacent the silicon rubber or other elastic layer and the sealing bar. The flexibility of the sealing bar along its entire length can be facilitated if it comprises a portion having a cross-section which converges towards its heating surface, the sealing bar being held to its support means by metal sheathing which is fixed to the support means and embraces the converging portion of the sealing bar so that the heating surface projects the beyond the sheathing. In this way the sealing bar is mounted so that it can be freely displaced towards the elastic layer for the purpose of compensating unevenness in the plies to be heat-sealed. Further, it is of advantage for each end of the sheathing to comprise a tab which engages around the ends of the sealing bar. The tabs are preferably resilient to allow for elongation of the sealing bar caused by expansion under heat.

In one form of the invention, the sheathing is provided with a thermally insulating lining which is preferably of asbestos. These asbestos layers extend along the longitudinal sides of the sealing bar and, together with the aforementioned thermally insulating intermediate layer disposed between the base bar and the intermediate bar, define a thermally insulating shell which surrounds the sealing bar and the elastic layer and ensures that almost all the available heat is transmitted to the operative or heating surface of the sealing bar. The thermally insulating shell has the particular purpose of avoiding heat radiation from the elastically mounted sealing bar, heat rising beyond the region of the seam also being kept to a minimum and possible overheating of the materials beyond the region of the seam being prevented. The intermediate bar beneath the silicon rubber layer serves as a so-called heat cushion which substantially equalizes fluctuations in the temperature control. In addition, relatively rapid heating of the sealing bar is possible after the apparatus has been switched off for a short time.

A heating element for the sealing bar is preferably of rod form and can either be embedded in the sealing bar by moulding or casting it therein, thereby excluding any air pockets that might have an insulating effect, or it can be inserted in a groove of the sealing bar and covered by a plate which is an accurate fit in the groove and which may be pinned to the sealing bar.

To prevent the carrier or outer ply of the composite material from being baked onto the heated sealing bar, the heating surface of the latter is preferably covered by a non-stick film such as polytetrafluoroethylene which is wound on rotatable shafts along each side of the sealing jaw, provision being made intermittently to lock the shafts against rotation.

The jaw carrying the elastic layer may be the lower jaw fixed to a frame of the apparatus whilst the other jaw is movable by a plurality of hydraulic or pneumatic pistons having piston rods which, by means of pivot pins extending transversely to the length of the jaws, are hinged to pressers for supporting members for the said other jaw extending longitudinally thereof. The hinged mounting of the pressers for the supporting members ensures that the other jaw, which is not provided with an elastic layer, can also freely adapt to any irregularities in the composite material to be heat-sealed. In addition, the supporting members extending longitudinally of the jaw avoid application of the pressure to the jaw at isolated points and consequent bending thereof. One of the supporting members is preferably held to its associated presser against displacement, for example by a pin on the supporting member engaging in a recess of the presser, whilst the other supporting members are slidable with respect to their pressers lengthwise of the jaw so as to avoid difficulties that might otherwise arise by variations in length caused by heating of the jaw. If, as is preferred, the upper jaw of the apparatus is movable, the supporting members can be held in grooves of the pressers by tension springs, this enabling easy dismantling of the jaw and again making allowance for thermal elongation which precludes rigid mounting of the supporting members to the pressers. The pressers associated with the outer supporting members may be provided with guide grooves for the respective supporting members whilst the inner presser or pressers have no guide grooves and thus exclusively serve to transmit the pressure and prevent difficulties in guiding. To minimize the amount of heat transmission from the movable jaw, the side of the supporting members facing the jaw may be provided with channels which extend transversely of the jaw, the channels defining ribs through which only a relatively small amount of heat can be transmitted.

The movable jaw and means for moving same may be mounted on a pivotable beam to facilitate adjustment and maintenance of the apparatus.

Examples of the invention are illustrated in the accompanying drawings wherein.

Figure 1:
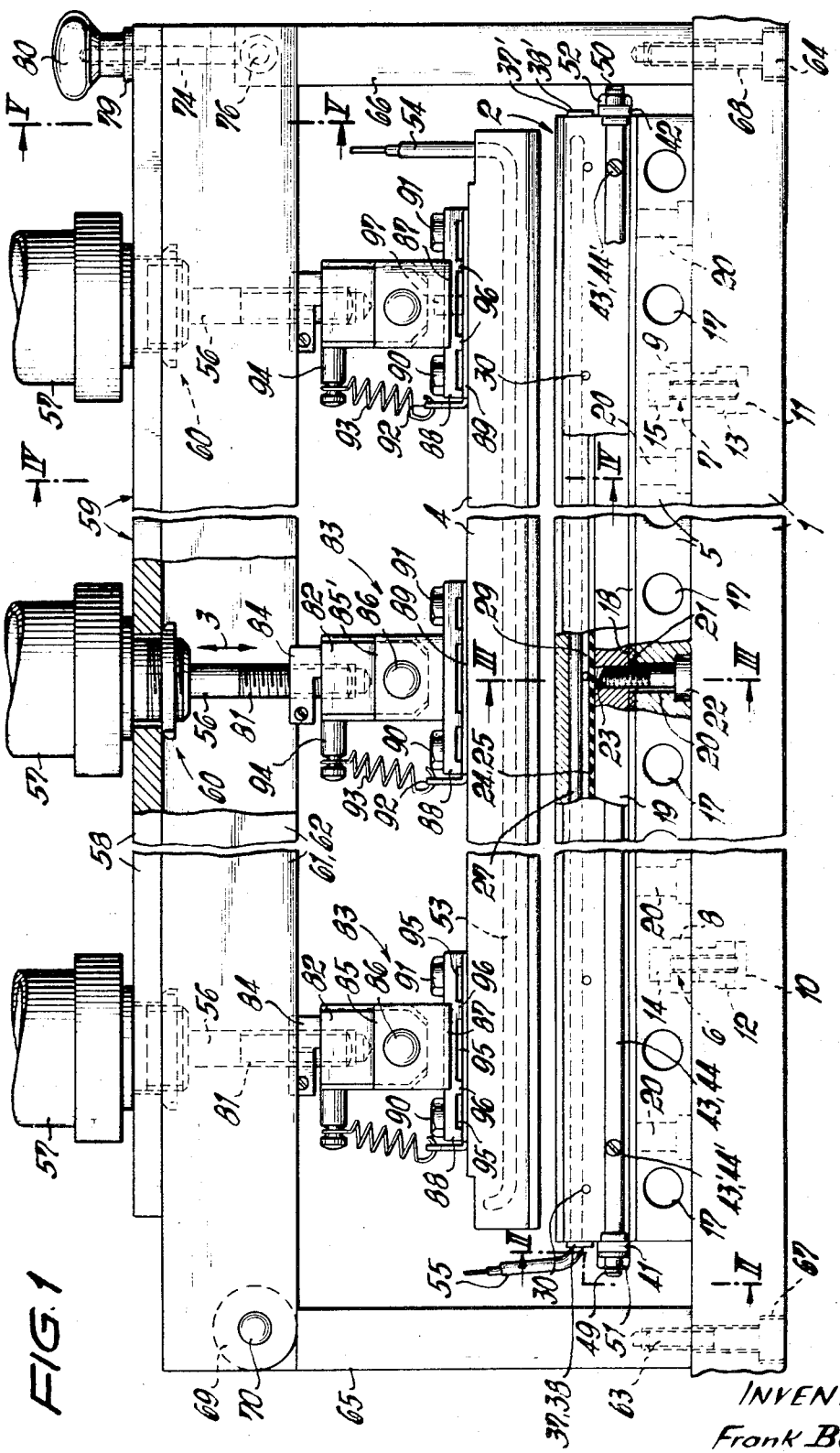
FIG. 1 is a fragmentary plan of a heat-sealing apparatus.

The heat-sealing apparatus illustrated in FIG. 1 comprises a sealing jaw 2 fixed to a table 1 of the apparatus. The jaw 2 co-operates with a sealing jaw 4 which is movable in the direction of the arrows 3 to apply pressure to composite material which is to be heat-sealed between the jaws. The lower portion of the jaw 2 comprises a base bar 5 provided with lugs 8 and 9 having holes 6 and 7 (also see FIG. 3). For the purpose of fixing the base bar 5, the table 1 is provided with T-shaped channels 10 and 11 containing T-shaped nuts 12 and 13 engaging bolts 14 and 15 passed through the holes 6 and 7. To adjust the jaw 2 in the direction of the arrow 16 shown in FIGS. 2 and 3, the bolts 14 and 15 are loosened and the jaw 2 is displaced so that the bolts 14 and 15 and the nuts 12 and 13 can slide along the channels 10 and 11. The jaw 2 is fixed in position after adjustment by tightening the bolts 14 and 15. To minimize the heat transmitting surface between the jaw 2 and the table 1, the base bar 5 is provided with transverse holes 17 at uniform intervals along its length. Provided on the base bar 5 there is an asbestos intermediate layer 18 which is covered by an intermediate bar 19. To fix the intermediate bar 19 to the base bar 5, the latter is provided with countersunk holes 20 at uniform intervals along its length to align with corresponding holes 21 in the asbestos layer 18. Bolts 22 are passed through the aligned holes 20 and 21 and engaged in tapped holes 23 of the intermediate bar 19. The components which are thus bolted together, namely the base bar 5, the intermediate asbestos layer 18 and the intermediate bar 19, together form support means for a heat-sealing bar 25, an elastic layer 24 of, say, silicon rubber being interposed between the support means and the sealing bar 25. A lower portion 25' of the sealing bar 25 is of parallelepiped form (FIG. 3) and has a width corresponding to the width of the intermediate bar 19 and the elastic layer 24. In the vicinity of the operative or heating surface 26 of the sealing bar (FIGS. 2 and 3), the latter has a portion 25'' of which the cross-section converges trapezoidally towards a parallelepiped portion 25''' which defines the actual heating surface 26. The sealing bar 25 is as flat as possible so that its resistance to bending is sufficiently small for the bar to adapt itself to any irregularities in the composite material to be heat-sealed and thereby permit substantially uniform heat-sealing along the entire length of the bar 25.

Figure 2:
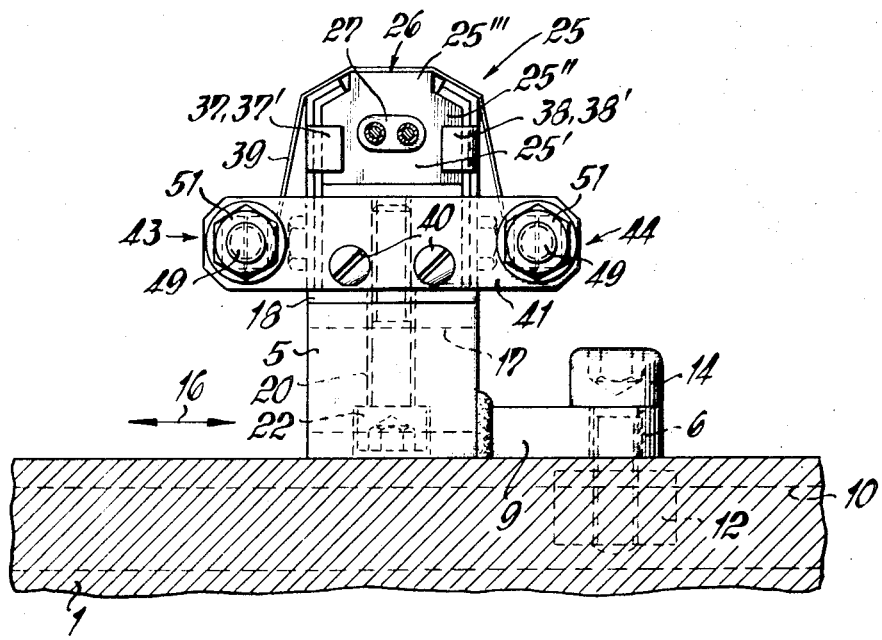
FIG. 2 is an enlarged section on the line II—II in FIG. 1.
Figure 3:
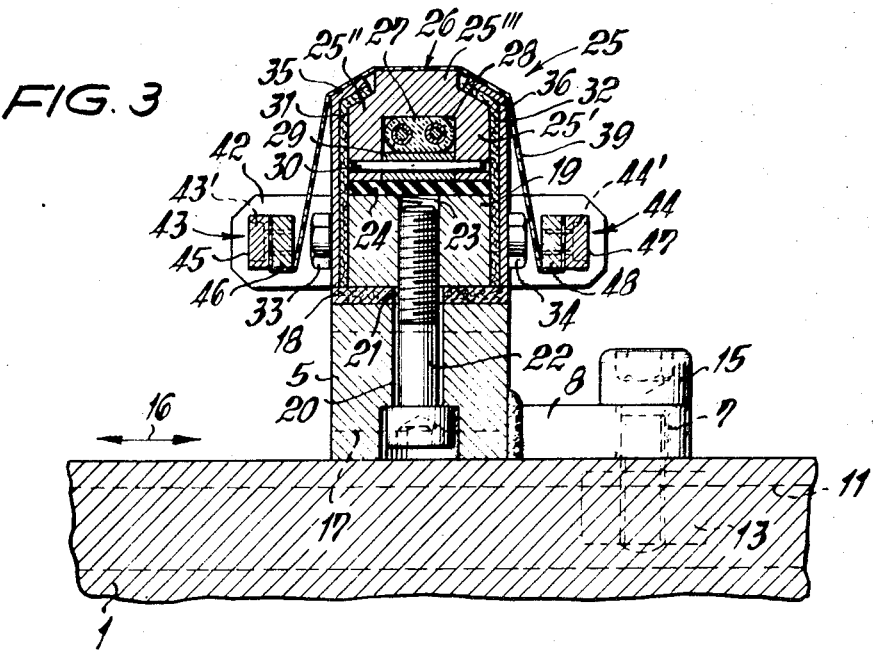
FIG. 3 is an enlarged section on the line III—III of FIG. 1 but showing a modification of the way in which a heating element is mounted in a sealing bar.

A heating element 27 of rod form is provided within the sealing bar 25. In the FIG. 2 embodiment, the heating element is cast or moulded into the bar 25 whilst in FIG. 3 the element 27 is an accurate fit in a groove 28 of the sealing bar and fully covered by an accurately fitting plate 29. The cover plate 29 is fixed to the bar 25 by means of uniformly spaced pins 30 (FIGS. 1 and 3).

The two longer sides of the intermediate bar 19 (FIG. 3) and the sealing bar 25 are covered with asbestos layers 31 and 32 which are fixed to metal sheathing 35 and 36 and to the intermediate bar 19 by means of bolts 33 and 34. The asbestos layers 31 and 32 and the sheathing 35 and 36 extend from the asbestos intermediate layer 18 up to the tapered faces of the converging portion 25'' of the sealing bar and are bent therearound to hold the sealing bar 25 to the elastic layer 24. In order that the sheathing 35 and 36 will not project beyond the side faces of the base bar 5, the width of the base bar 5 and of the intermediate layer 18 is larger than that of the intermediate bar 19, elastic layer 24 and sealing bar 25 by an amount equivalent to the thickness of the layers 31 and 32 and sheathing 35 and 36. The ends of the sheathing 35 and 36 are provided with tabs 37, 37' and 38, 38' (FIGS. 1 and 2), every two of which lie against the associated end face of the sealing bar 25. The tabs 37, 37' and 38, 38' are preferably resilient so that, whilst they will hold the sealing bar 25 against longitudinal displacement, they will yield to elongation of the bar 25 caused by heating.

To prevent the composite material that is to be heat-sealed from baking onto the sealing bar 25, the heating surface 26 of the latter is provided with a silk cover 39 (FIG. 3) which is coated or impregnated with polytetrafluoroethylene and which is wound onto winding shafts 43 and 44 that are mounted on both sides of the jaw 2 in bearings 41 and 42 secured to the ends of the intermediate bar 19 by bolts 40. Each of the winding shafts 43 and 44 consists of two bars 45, 46 and 47, 48 (FIG. 3) which are of rectangular cross-section, are interconnected by bolts 43' and 44' and between which the polytetrafluoroethylene film 39 is clamped, the film having appropriate holes for the bolts 43' and 44'. One bar 46 or 48 of each shaft 43 or 44 is provided at its ends with trunnions which engage in the bearings 41 and 42 and the ends of which are provided with a screwthread 49 and 50 for engaging a nut 51 and 52 (FIGS. 1 and 2). After the tension of the protecting film has been set, the nuts 51 and 52 can be tightened against the bearings 41 and 42 so that the shafts 43 and 44 are locked against rotation.

The upper jaw 4 (FIGS. 1 and 4) which is movable in the direction of the arrows 3 and exerts pressure during heat sealing is similarly equipped with a protecting film. A heating element 53 of rod form is sealed into the jaw 4, one end 54 of the heating element projecting from the jaw for connection to an electric terminal. For the same purpose, one end 55 (FIG. 1) of the heating element 27 in the sealing bar 25 also projects from the jaw 2. The two ends of a heating coil within each heating element 27 and 53 pass through the projecting ends 54 and 55 to a transformer (not shown).

Figure 4:
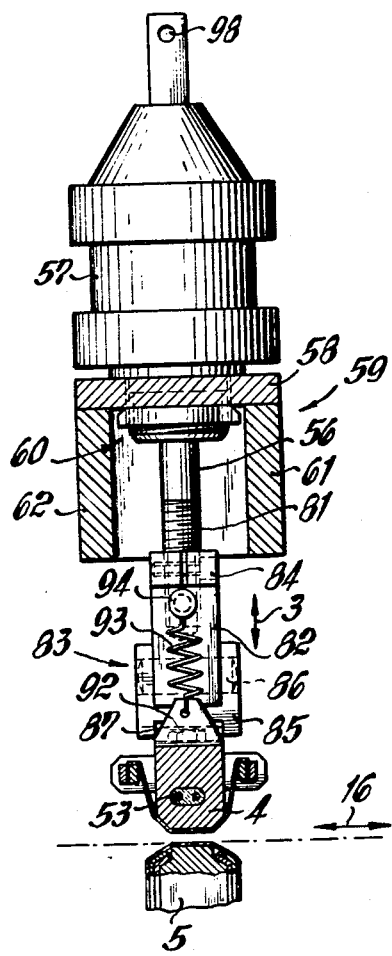
FIG. 4 is a section on the line IV—IV in FIG. 1.
Figure 5:
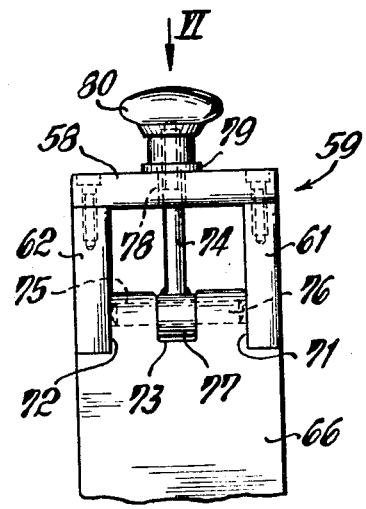
FIG. 5 is a section on the line V—V in FIG. 1.
Figure 6:
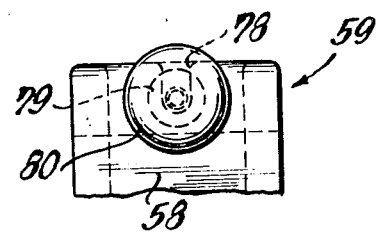
FIG. 6 is a view taken in the direction of the arrow B in FIG. 5.

Reciprocating movement of the sealing jaw 4 in the direction of the arrows 3 and transmission of the pressure during heat sealing is effected by three spindles 56 which are actuated and controlled by hydraulic or pneumatic pistons located in cylinders 57. The cylinders 57 are mounted on a web 58 (FIGS. 1 and 4) of a U-section bridge 59 and fixed thereto by screwthreads 60. The ends of the limbs 61 and 62 of the U-section bridge rest on columns 65 and 66 which are fixed to the table 1 by bolts 63 and 64 (FIG. 1). The bolts 63 and 64 are passed through T-channels 67 and 68 in the table 1 and can slide in the channels for the purpose of adjusting the bridge 59 and the sealing jaw 4 carried thereby in the direction of the arrows 16 (FIG. 4). The end of the column 65 remote from the table 1 is provided with a sleeve 69 which engages a pivot pin 70 of which both ends project from the sleeve and engage in holes in the limbs 61 and 62 of the bridge so that the bridge can be swung about the pivot pin 70. To lock the bridge 59 in a predetermined angular position, the limbs 61 and 62 lie in corresponding recesses 71 and 72 (FIG. 5) at the top of the column 66. Between the recesses 71 and 72 there is a further recess 73 for receiving one end of a lever-like bolt 74. A hinge pin 76 in a hole 75 at the top of the column 66 in the region of the recess 73 also passes through a hole 77 in the end of the lever-like bolt 74, the bolt 74 being pivotable about the hinge pin 76. The bolt 74 can be swung up to a slot 78 in the web 58 of the bridge 59 (FIGS. 5 and 6), the screw-threaded end projecting beyond the web 58. This end of the bolt 74 is provided with a washer 79 and a nut 80 by which the bridge 59 can be fixed in the predetermined position. However, the aforementioned bridge construction and its displaceability are mentioned strictly by way of example. In another construction, the bridge may be a fixed frame equipped with rails which replace the web 58 and in which the individual cylinders 57 are longitudinally displaceable and fixable with the aid of an elongated hole.

The following is a description of one of three identical suspensions for the upper sealing jaw 4. The spindle 56 reciprocatable in the direction of the arrows 3 in FIGS. 1 and 4 is provided with a screwthread 81 at the end adjacent the jaw 4. The screwthread 81 is engaged in a first element 82 of a hinge 83. To clamp the spindle 56 tight, a clamping ring 84 is fixed to the top of the element 82. The element 82 is embraced by a forked second element or presser 85 which can swing about a pivot pin 86 extending transversely to the jaw 4 and interconnecting both elements 82 and 85. The pressers 85 nearest the ends of the jaw 4 are each provided with a groove 87 which receives a steel plate 88 having the same width as the jaw 4. To avoid an excessively rigid connection, the pressure face of the central presser 85' is plain and therefore the central presser merely transmits pressure to the associated steel plate 88.

The plates 88 constitute supporting members for the jaw 4. Each such plate is screwed to the jaw 4 by bolts 90 and 91, an interposed metal plate 89 serving as a shim. The length of the plates 89 and 88 is such that they cover an adequately large part of the rear face of the jaw 4 and distribute the pressure to be exerted thereon. One end of the plate 89 is flanged upwardly at 92 and connected to one end of a tension spring 93 of which the other end is fixed to a pin 94 anchored in the hinge element 82. The spring 93 pulls the jaw 4 into engagement with the presser 85.

To minimize the transmission of heat from the jaw 4 to the remainder of the apparatus, the face of the plate 88 adjacent the jaw 4 is provided with grooves 95 which extend transversely to the length of the jaw 4. The ribs 96 left between adjacent grooves in co-operation with the plate 89 ensure that the surface of the jaw 4 is substantially uniformly loaded.

Elongation of the jaw 4 is taken into account by providing that only one outer presser 85 is provided with a pin 97 which projects from the groove 87 and engages in a hole in the plate 88. When the jaw 4 elongates under thermal effects, the plate 88 at the other end of the apparatus can slide in the groove 87 of the presser which is here not provided with a pin equivalent to the pin 97, whilst in the central region of the apparatus the plate 88 is in any case not guided in the presser 85'.

Adaptation of the pressers to the sealing jaw 4 takes place by turning the screw-threaded spindles 56, this being effected by a transverse hole 98 at the upper projecting end of each spindle 56.

I claim:

1. Apparatus having sealing jaws each of said sealing jaws being equipped with a flexible sealing bar, each of the said sealing bars being heated by a heating element of rod form, said heating elements being inserted into the pertaining sealing bar, the apparatus comprising an elastic layer to compensate for differences in the thickness of the plies of material to be sealed between the sealing jaws along the intended heat seal, the elastic layer being disposed between the sealing bar of one of said sealing jaws and support means for that sealing bar.

2. Apparatus according to claim 1 wherein the jaw carrying the elastic layer is fixed to a frame and the other jaw is movable by a plurality of hydraulic or pneumatic pistons having piston rods which, by means of pivot pins extend transversely to the length of the jaws, are hinged to supporting members for the said other jaw extending longitudinally thereof.

3. Apparatus according to claim 1, wherein the said support means comprise a base bar, a thermally insulating intermediate layer and an intermediate bar.

4. Apparatus according to claim 1, wherein the sealing bar comprises a portion having a cross-section which converges towards its sealing surface and the sealing bar is held to its support means by metal sheathing fixed to the support means, the sheathing embracing the converging portion of the sealing bar so that the heating surface projects beyond the sheathing.

5. Apparatus according to claim 4, wherein each end of the sheathing comprises a tab engaging around the ends of the sealing bar.

6. Apparatus according to claim 5, wherein the tabs are resilient.

7. Apparatus according to claim 4, wherein the sheathing is provided with a thermally insulating lining.

8. Apparatus according to claim 1, wherein said heating element of rod form is moulded into the sealing bar.

9. Apparatus according to claim 1, wherein said a heating element of rod form is inserted in a groove of the sealing bar and covered by an accurately fitting plate.

10. Apparatus according to claim 1, wherein the heating surface of the sealing bar is covered by a non-stick film wound on rotatable shafts along each side of said one jaw.

11. Apparatus according to claim 10, wherein the non-stick film comprises polytetrafluoroethylene.

12. Apparatus according to claim 5, wherein the supporting members are associated with pressers, one of the supporting members being held to its associated presser against displacement whilst the others are slidable with respect to their pressers lengthwise of the jaws.

13. Apparatus according to claim 12, wherein the supporting members are held to the pressers by tension springs.

14. Apparatus according to claim 12, wherein there are at least three supporting members for the said other jaw, the pressers associated with the outer supporting members being provided with guide grooves for the respective supporting members.

15. Apparatus according to claim 5, wherein the supporting members are provided with ribs which extend transversely of the jaws and lie against the said other jaw.

16. Apparatus according to claim 5, wherein the said other jaw and means for moving same are mounted on a pivotable beam.

* * * * *

UNITED STATES PATENT OFFICE
CERTIFICATE OF CORRECTION

Patent No. 3,721,602          Dated March 20, 1973

Inventor(s) FRANK BOSSE

It is certified that error appears in the above-identified patent and that said Letters Patent are hereby corrected as shown below:

On the title page, insert the following:

-- [30]  Foreign Application Priority Data

Feb. 2, 1970   Germany ....... P 20 04 574.3 --

Signed and sealed this 9th day of April 1974.

(SEAL)
Attest:

EDWARD M. FLETCHER, JR.        C. MARSHALL DANN
Attesting Officer             Commissioner of Patents